(12) United States Patent
Peak et al.

(10) Patent No.: US 8,001,359 B2
(45) Date of Patent: Aug. 16, 2011

(54) MAPPING AN N-BIT APPLICATION PORTED FROM AN M-BIT APPLICATION TO AN N-BIT ARCHITECTURE

(75) Inventors: Christopher G. Peak, San Jose, CA (US); Martin Scheinberg, Morganville, NJ (US); Joseph Sokol, Jr., San Jose, CA (US)

(73) Assignee: Apple Inc., Cupertino, CA (US)

( * ) Notice: Subject to any disclaimer, the term of this patent is extended or adjusted under 35 U.S.C. 154(b) by 417 days.

(21) Appl. No.: 12/241,039

(22) Filed: Sep. 30, 2008

(65) Prior Publication Data

US 2009/0031102 A1    Jan. 29, 2009

Related U.S. Application Data

(62) Division of application No. 11/498,617, filed on Aug. 3, 2006, now Pat. No. 7,451,298.

(51) Int. Cl.
*G06F 12/08* (2006.01)

(52) U.S. Cl. ........ 711/203; 711/202; 711/206; 712/200; 713/2

(58) Field of Classification Search .............. 711/202, 711/203, 206; 712/200; 713/2
See application file for complete search history.

(56) References Cited

U.S. PATENT DOCUMENTS

| | | | |
|---|---|---|---|
| 5,734,904 A | 3/1998 | Kanamori et al. | |
| 5,968,174 A | 10/1999 | Hughes | |
| 6,973,562 B1 | 12/2005 | McGrath et al. | |
| 7,260,702 B2 | 8/2007 | Vega et al. | |
| 2001/0034822 A1 * | 10/2001 | Weinreb et al. | 711/203 |
| 2006/0212609 A1 | 9/2006 | Zimmer et al. | |

* cited by examiner

*Primary Examiner* — Jae U Yu
(74) *Attorney, Agent, or Firm* — Park, Vaughan, Fleming & Dowler LLP; Laxman Sahasrabuddhe

(57) ABSTRACT

Embodiments of the present invention provide a system that maps an N-bit application to virtual memory. The N-bit application may be obtained by porting an M-bit application to an N-bit architecture where N is greater than M. During operation, the system receives a request to map an N-bit application to a computer's virtual memory. The system then maps the N-bit application to a section of virtual memory which begins at a memory address that is greater than or equal to $2^M$. If the N-bit application accesses a memory address which is less than $2^M$, the system can generate a trap, thereby facilitating the discovery of M-bit memory references in the N-bit application.

3 Claims, 2 Drawing Sheets

MAPPING AN N-BIT APPLICATION PORTED FROM AN M-BIT APPLICATION TO AN N-BIT ARCHITECTURE

RELATED APPLICATIONS

This application is a divisional application of, and hereby claims priority under 35 U.S.C. §120 to, pending U.S. patent application Ser. No. 11/498,617, filed 3 Aug. 2006, entitled "Processing Exceptions from 64-Bit Application Program Executing in 64-Bit Processor with 32-bit OS Kernel by Switching to 32-Bit Processor Mode".

FIELD OF THE INVENTION

The present invention relates to operating systems. More specifically, the present invention relates to a method and an apparatus to use a 32-bit operating system kernel to support 64-bit applications in addition to legacy 32-bit applications.

BACKGROUND

Related Art

The exponential increase in the size and complexity of processors has been accompanied by a similar explosion in the size and complexity of software applications that execute on these processors. Furthermore, the amount of data that these software applications manipulate has also increased dramatically.

These developments have created a strong need to migrate computer systems to 64-bit architectures. Note that today's 32-bit architectures are limited to 4 GB (gigabytes) of virtual memory space. By moving to a 64-bit architecture, a computer system can support applications that require a substantially larger virtual memory space. Furthermore, 64-bit processors typically have additional capabilities which can substantially improve the performance of these applications.

Unfortunately, migrating from a 32-bit architecture to a 64-bit architecture can require substantial amount of time and resources. Prior art techniques to upgrade to a 64-bit architecture usually require a brand new operating system (OS) which is specifically written for the 64-bit architecture. In particular, prior art techniques typically create the new 64-bit OS kernel by making extensive modifications to an existing 32-bit OS kernel. Furthermore, prior art techniques typically require third party vendors to rewrite their device drivers to interoperate with the new 64-bit OS kernel.

Note that, since the OS is a fundamental piece of software, it is usually subjected to a battery of stringent regression tests before it is introduced in the market. Unfortunately, making extensive changes to a complex piece of software, such as an OS kernel, inevitably creates a number of subtle bugs that can take weeks or even months to identify and fix. Due to these reasons, prior art techniques typically require a large team of engineers to work for a number of months, if not years, to upgrade an OS to a 64-bit architecture.

Hence, what is needed is a method and an apparatus to enable a system to migrate from a 32-bit architecture to a 64-bit architecture without the above-described problems.

SUMMARY

One embodiment of the present invention provides a system that uses an M-bit OS kernel to support N-bit user processes. During operation, the system receives an exception. Note that the exception can be any event that needs to be handled by executing OS kernel code. Specifically, the exception can be a hardware interrupt, a software interrupt, an asynchronous interrupt, a synchronous interrupt, a signal, a trap, or a system call. Next, the system handles the exception by first switching the processor to the M-bit mode, and then executing M-bit OS kernel code which is designed to handle the exception. Note that the processor may be designed to operate in the N-bit mode, while the M-bit mode may be provided for backward compatibility reasons. Note that in one embodiment, N can be greater than M. Specifically, N can be equal to 64, and M can be equal to 32.

In a variation, the exception can occur during the execution of an M-bit process, an N-bit process, or the M-bit OS kernel. Furthermore, the exception may occur when a hardware device generates an asynchronous hardware interrupt, a user process makes a system call, or a user process causes a trap.

In a variation, after handling the exception, the system returns control to an M-bit process or an N-bit process.

In a variation, prior to handling the exception, the processor automatically switches to the N-bit mode.

In a variation, the M-bit OS kernel maps N-bit applications to a section of memory that begins at a memory address that is greater than or equal to $2^M$.

One embodiment of the present invention provides a system that maps an N-bit application to virtual memory. The N-bit application may be obtained by porting an M-bit application to an N-bit architecture. Note that N is greater than M. During operation, the system receives a request to map an N-bit application to a computer's virtual memory. The system then maps the N-bit application to a section of virtual memory which begins at a memory address that is greater than or equal to $2^M$. If the N-bit application accesses a memory address which is less than $2^M$, the system can generate a trap, thereby facilitating the discovery of M-bit memory references in the N-bit application.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Computer System

Figure 1:
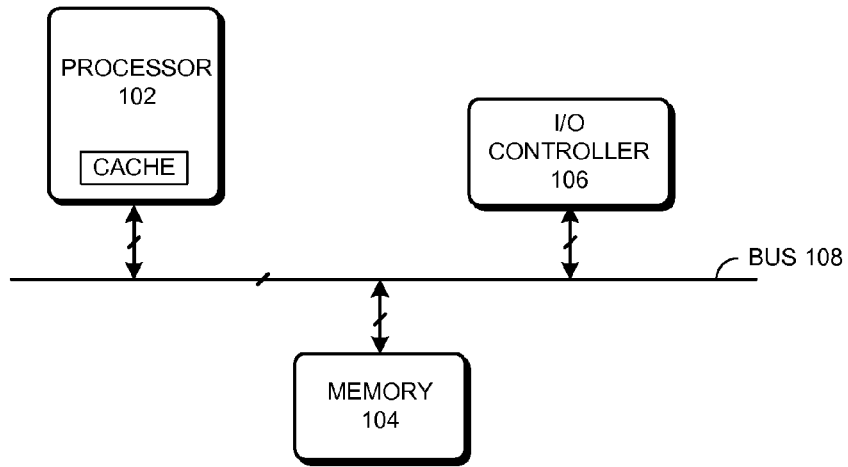
FIG. 1 illustrates a computer system in accordance with an embodiment of the present invention.

FIG. 1 illustrates a computer system in accordance with an embodiment of the present invention.

A computer system can generally include any type of computer system, including, but not limited to, a computer system based on a microprocessor, a mainframe computer, a digital signal processor, a portable computing device, a personal organizer, a device controller, or a computational engine within an appliance.

A computer system typically comprises processor 102, physical memory 104, and I/O (Input/Output) controller 106, which can communicate with one another using bus 108. During operation, processor 102 executes instructions stored in physical memory 104.

Physical memory 104 can be substantially smaller than the total memory space that can be used by processor 102. Specifically, computer systems often use virtual memory to enable software applications to use an address space that can be substantially greater than the physical memory available on the computer system.

I/O controller 106 can be used by processor 102 to communicate with I/O devices (not shown). A system may transfer data directly between memory 104 and an IPO device using a DMA (Direct Memory Access) operation.

32-Bit and 64-Bit Architectures

A 32-bit architecture generally refers to a system whose registers are 32 bits wide and which is generally designed to manipulate 32-bit "chunks" of data. Likewise, a 64-bit architecture usually has registers that are 64 bits wide and the system is generally designed to manipulate 64-bit "chunks" of data.

A processor is typically designed so that the contents of a single register can store a virtual memory address. Hence, the virtual memory size is usually determined by the width of the processor's registers. Specifically, a 32-bit processor's virtual address space is usually limited to 4 GB, whereas the virtual address space of a 64-bit processor is usually substantially larger than 4 GB.

Note that, although a processor may be 32-bit or 64-bit internally, its external data bus or address bus may have a different size. For example, even though a 64-bit processor may support a 64-bit virtual memory space, it may not be able to physically address the whole virtual memory space. Specifically, a 64-bit processor may only be able to access a 48-bit physical memory.

A 32-bit kernel primarily contains machine instructions that are designed to execute on a 32-bit architecture. Specifically, a 32-bit kernel usually assumes that address pointers, registers, integers, etc. are all 32 bits wide. Similarly, a 64-bit kernel primarily contains machine instructions that are designed to execute on a 64-bit architecture. Specifically, a 64-bit kernel usually assumes that address pointers, registers, integers, etc. are all 64 bits wide. Prior art techniques typically rewrite the entire 32-bit OS kernel code so that it conforms to the 64-bit data model.

Note that user applications must also be ported to 64-bits to reap the benefits of the 64-bit architecture. Legacy 32-bit applications can be supported by a 64-bit OS using a hardware compatibility mode which supports the legacy 32-bit instruction set. Alternatively, legacy 32-bit applications can be supported using software emulation or by implementing a 32-bit processor core within the 64-bit processor die.

Porting applications from a 32-bit architecture to a 64-bit architecture is usually very problematic. Many applications developers assume that pointers have the same length as certain other data types. Although such assumptions may be true on some systems, they are usually not true on 64-bit systems. Applications that are ported using such assumptions typically cause unwanted exceptions and traps to be generated during execution.

Virtual Memory Layout

Figure 2:
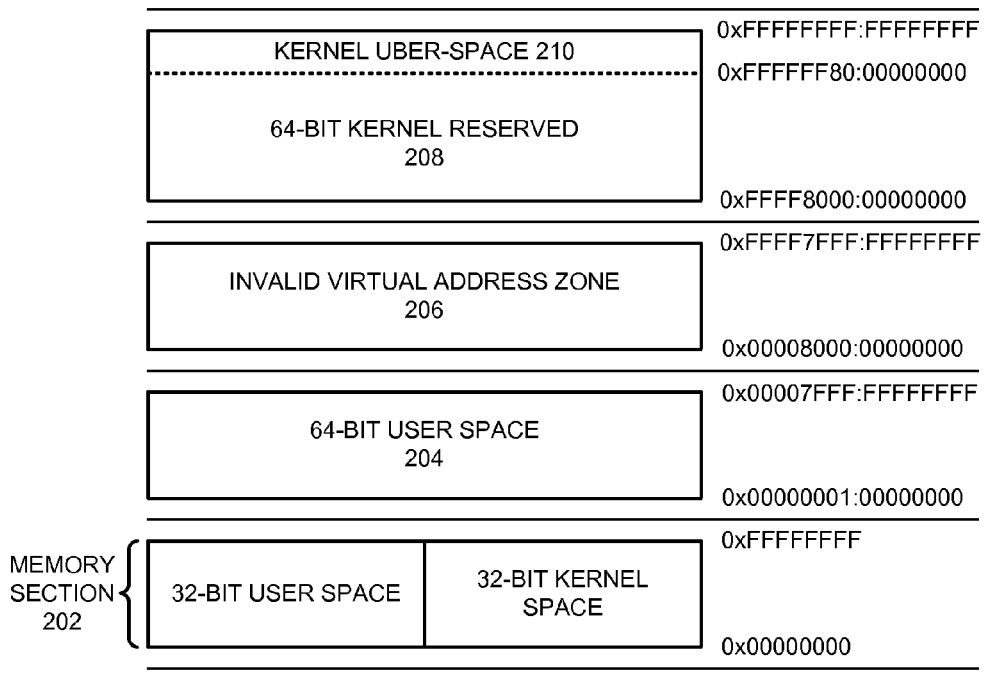
FIG. 2 illustrates an exemplary 64-bit virtual memory layout in accordance with an embodiment of the present invention.

FIG. 2 illustrates an exemplary 64-bit virtual memory layout in accordance with an embodiment of the present invention.

The virtual memory layout shown in FIG. 2 is divided into four memory sections. Memory section 202 can be used by a 32-bit user application as well as a 32-bit kernel. The size of memory section 202 can be equal to 4 GB, which is the total virtual memory space in a 32-bit system. In some 32-bit systems, the virtual memory space is shared between user applications and the kernel. Hence, when a 64-bit processor is operating in 32-bit compatibility mode, memory section 202 may be shared between 32-bit user applications and a 32-bit kernel. The system can support the two overlapping memory spaces by loading page tables or registers associated with page tables with appropriate entries whenever the system switches from user mode to kernel mode. Specifically, on Intel platforms, the system can load the page table translation table base (CR3) with appropriate entries whenever the system switches from user mode to kernel mode.

In 64-bit architectures, the system may not share memory section 204 between the kernel and the user. Specifically, memory section 204 may be used exclusively by user applications, while the 64-bit kernel may reside in a reserved high memory area (e.g., memory section 208) which is disjoint from memory section 204.

Note that the size of memory section 204 is almost equal to 128 TB (terabytes), which is substantially larger than 4 GB, which is the total virtual memory space of a 32-bit system.

Memory section 206 may be designated as an invalid virtual memory address zone. Further, memory section 208 may be reserved for a 64-bit kernel.

An operating system that contains a full-fledged 64-bit kernel can locate the kernel in memory section 208. Note that 32-bit kernel code cannot execute in this memory section because this memory section is beyond the 32-bit virtual memory space. In one embodiment of the present invention, the system stores the 32-bit kernel in memory section 202, and stores a mirror of the 32-bit kernel in memory section 208.

Memory section 208 can contain a special section called "kernel uber-space" 210, which can store special 64-bit code which can facilitate a 32-bit kernel to support 64-bit user applications.

Process for Mapping a 64-Bit Process to Virtual Memory

Figure 3:
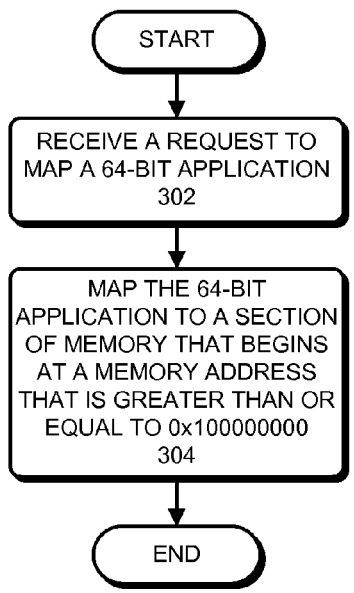
FIG. 3 presents a flowchart that illustrates a process for mapping a 64-bit process to virtual memory in accordance with an embodiment of the present invention.

FIG. 3 presents a flowchart that illustrates a process for mapping a 64-bit process to virtual memory in accordance with an embodiment of the present invention.

The process typically begins by receiving a request to map a 64-bit application to virtual memory (step 302).

The system then maps the 64-bit application to a section of virtual memory which begins at a memory address that is greater than or equal to 0x100000000 (step 304).

In one embodiment, the system maps 64-bit user applications to memory section 204. Note that memory section 204 starts at address 0x100000000 (4 GB). By mapping 64-bit applications to an address beyond 4 GB, the system doesn't have to switch between the kernel's 32-bit space and the user's 32 bit space. This improves performance because the system avoids flushing the TLB (translation lookaside buffer) whenever the system switches between the 32-bit kernel and the 64-bit user application.

A further advantage of mapping user applications to memory section 204 is that it prevents 32-bit values from being used as pointers in 64-bit applications. Page zero is typically not accessible to user applications. If a user application accesses a memory location in page zero, it generates a trap. Hence, employing a 4 GB page zero and mapping user applications to memory section 204 can help application developers to quickly discover memory references that were not properly ported to 64 bits.

Using a 4 GB page zero can detect not only null pointers (which some prior art techniques may also detect), but also any 64-bit pointers whose top 32 bits are all zero. Since prior art systems don't use a 4 GB page zero, 64-bit applications might function correctly in these systems until their virtual size grew above 4 GB whereupon random results might occur. In contrast to prior art systems, embodiments of the present invention can immediately discover incorrectly ported code which uses a 32-bit pointer instead of a 64-bit pointer.

Note that a 4 GB page zero is not obvious. In some prior art techniques, page zero contains a few kilobytes or megabytes of low memory, which is sufficient to catch null pointers. However, a 4 GB page zero is not obvious because it is substantially larger than a few kilobytes or megabytes and there is no reason to create such a large page zero to catch null pointers. The present invention uses such a large page zero because it is directed towards discovering memory references in a 32-bit application that were not properly ported to 64 bits. Prior art approaches that do not have 4 GB page zeros cannot discover such errors.

Note that although the above description describes the mapping process in the context of a 64-bit virtual space, the process can generally be used to map N-bit applications to an N-bit virtual space to help discover incorrectly ported code. Let us assume that the N-bit applications have been ported from an M-bit architecture, where N is greater than M. The lower $2^M$ bytes of memory can be called page zero, and the N-bit user applications can be mapped to an N-bit virtual address which is greater than or equal to $2^M$. As explained above, a memory reference (e.g., pointer) in the M-bit application that was not properly ported to N bits will generate a trap because it will try to access a memory location in page zero.

Process for Using a 32-Bit Kernel to Support 64-Bit Applications

Figure 4:
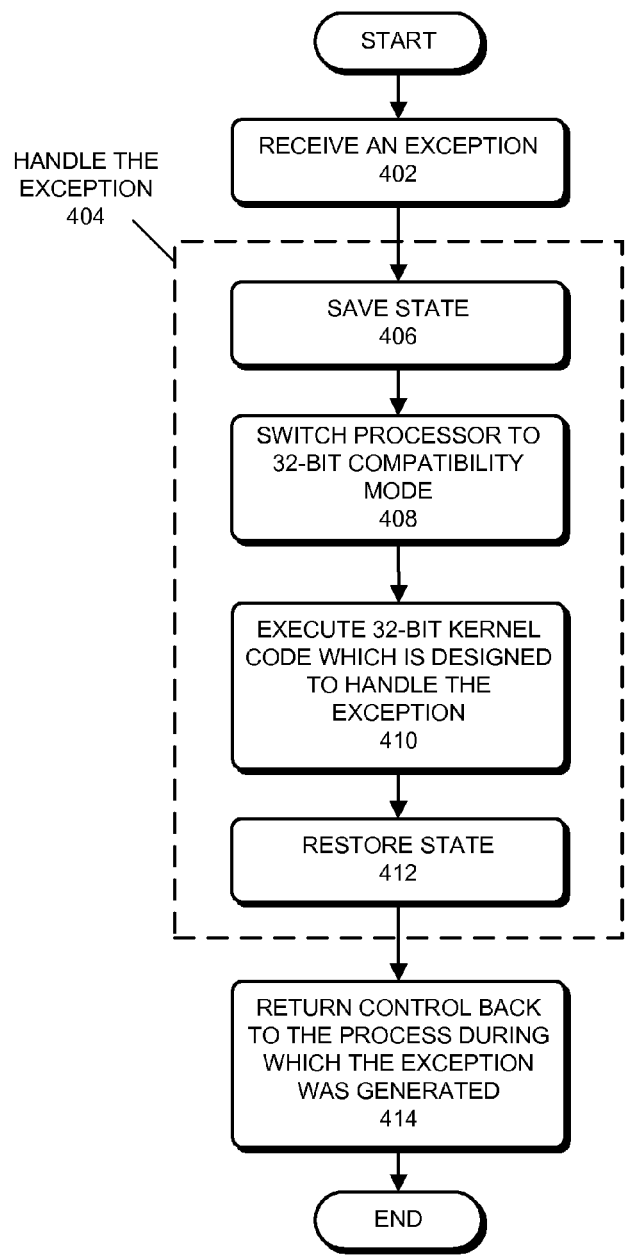
FIG. 4 presents a flowchart which illustrates a process for using a 32-bit kernel to support 64-bit user applications in accordance with an embodiment of the present invention.

FIG. 4 presents a flowchart which illustrates a process for using a 32-bit kernel to support 64-bit user applications in accordance with an embodiment of the present invention.

The process typically begins by receiving an exception (step 402).

An exception can generally be any event that needs to be handled by executing OS kernel code. For example, an exception can be a hardware interrupt, a software interrupt, an asynchronous interrupt, a synchronous interrupt, a signal, a trap, or a system call.

The exception may be generated during the execution of a 32-bit user process, a 64-bit user process, or the 32-bit OS kernel. Specifically, the exception may be generated when a user process makes a system call, a process causes a trap, or a hardware device generates an asynchronous hardware interrupt. In one embodiment, the processor automatically switches to the 64-bit mode when an exception occurs. Note that a process generally refers to a software entity that is managed by an OS, and which executes on a computing engine. Specifically, a process can be a task or a thread.

Note that a system usually determines an exception handler using an interrupt vector table. For example, on Intel-based architectures, the system may use an Interrupt Descriptor Table (IDT) to determine the location of the exception handler. (Note that "Intel" may be a trademark of Intel Corporation, which may be registered in the United States and/or other countries.)

The IDT can be an array of values, which are stored consecutively in memory, and which are indexed using the exception. These descriptors usually point to a memory location that contains code (i.e., machine instructions) which needs to be executed to handle the exception.

When the system receives an exception, it may disable all other exceptions so that the system does not receive any further exceptions while it is servicing the current exception. For example, the system may disable all interrupts and exceptions while servicing a hardware interrupt. On the other hand, when the system is servicing a software interrupt, the system may allow hardware interrupts to occur.

In one embodiment, the system can store the IDT anywhere in physical memory or virtual memory. Specifically, the system can store the IDT in kernel uber-space 210. In another embodiment, the IDT may be stored at a specific location in physical memory. In yet another embodiment, the system may store the IDT in a register within the processor. Specifically, the system may load the IDT registers with appropriate values during boot-up.

The processor may have special registers to store both the physical base address and the length of the IDT. When an exception occurs, the processor can determine the memory location of the exception handler using the physical base address and the IDT length. If an exception does not have an associated handler in the IDT, the system can generate a second exception whose handler deals with situations when the system receives an exception (e.g., the original exception) that does not have an associated handler. Conversely, if an exception is associated with a valid handler, the appropriate descriptor in the IDT is loaded into the appropriate registers and actions are taken according to the descriptor's type and contents.

Continuing with the flowchart in FIG. 4, the system then handles the exception using a 32-bit OS kernel (step 404). Note that this step can comprise a number of sub-steps which are described below.

In one embodiment, the system executes a small piece of 64-bit code before entering the 32-bit OS kernel to service the exception. Specifically, an IDT descriptor can point to this piece of 64-bit code, which may be located in kernel uber-space 210. Note that, in general, this piece of code can be located anywhere in the virtual memory space. Furthermore, note that, this piece of 64-bit code is an important aspect of the invention because it enables the system to use a 32-bit kernel to support 64-bit processes.

Specifically, this piece of 64-bit code usually causes the system to save the system state, which can depend on the type of the process and the type of the exception (step 406).

For example, the system may save different sets of registers for 32-bit processes and 64-bit processes. Similarly, the system may save different process states for a hardware interrupt and a software interrupt.

Continuing with the flowchart in FIG. 4, this piece of 64-bit code can cause the system to switch the processor to a 32-bit mode (step 408). For example, on an Intel 64-bit processor, the system may switch to a 32-bit "compatibility" mode which supports the legacy 32-bit instruction set.

Note that, in a 64-bit OS kernel, the IDT entries may directly point to the OS kernel code that handles the exceptions. However, in the present invention, the IDT entries point to the piece of 64-bit code which performs a number of housekeeping tasks before switching the processor to a 32-bit compatibility mode and executing the 32-bit OS kernel code.

Next, the system executes the 32-bit OS kernel code which is designed to handle the exception (step 410). Note that the 32-bit OS kernel may reside in memory section 202. Note that page tables or registers associated with page tables may need to be loaded with appropriate values so that the system can access the 32-bit OS kernel. For example, on Intel platforms, the page table translation table base (CR3) may need to be loaded with appropriate values.

Note that the piece of 64-bit code typically performs a few housekeeping operations (e.g., save system state, switch to 32-bit mode, restore system state, etc.), whereas the bulk of the exception handling occurs in the 32-bit OS kernel which resides in memory section 202.

The 32-bit OS kernel is usually aware that it is executing within a 64-bit virtual address space. Specifically, the 32-bit OS kernel can handle data structures that are used to manage 64-bit applications. For example, when the 32-bit OS kernel spawns a process it needs to know whether the underlying application is a 32-bit application or a 64-bit application because otherwise it may not know where to load the application. Likewise, the memory management code within the 32-bit OS kernel may also be rewritten so that it can handle a 64-bit virtual address space. However, these changes to the kernel are minor compared to the changes that prior art techniques require to port a 32-bit OS kernel to a 64-bit architecture.

Once the system finishes executing the appropriate portion of the 32-bit OS kernel, it jumps back to the piece of 64-bit code in kernel uber-space 210 and performs certain housekeeping tasks before returning control to the process whose execution was interrupted by the exception. Note that this special piece of 64-bit code may perform more housekeeping tasks than those described above. An important aspect of the present invention is that the system uses a small piece of 64-bit code to enable a 32-bit OS kernel to support 64-bit processes.

Continuing with the flowchart in FIG. 4, the system then restores the system state (step 412).

Finally, the system returns control back to the process during which the exception was generated (step 414).

Specifically, the system can return control to a 32-bit process or a 64-bit process. Note that the system may return control to a process which itself may have been in the middle of executing the 32-bit OS kernel code. Further, note that if the exception occurred during the execution of a 32-bit process, the system may switch back to 32-bit mode before executing the 32-bit application.

An embodiment of the present invention exploits the following insight: we can treat the 32-bit OS kernel as a 32-bit application. Hence, the same way we switch the processor to the 32-bit compatibility mode before executing a 32-bit application, we can switch the processor to the 32-bit compatibility mode before entering the 32-bit OS kernel.

Note that the present invention provides techniques and systems to use a stable 32-bit OS kernel to migrate to a 64-bit architecture. A possible drawback of this approach is that the 32-bit OS kernel may not be able to use the enhanced functionality of the 64-bit processor. Another potential drawback is that the performance of a 32-bit OS kernel may be inferior to the performance of a 64-bit OS kernel, because a 64-bit processor is usually not optimized for executing 32-bit code. Additionally, a 64-bit kernel does not incur the cost of switching the processor to a 32-bit mode every time it receives an exception. However, these drawbacks are insignificant compared to the tremendous advantages of reusing a robust, stable, well-tested 32-bit OS kernel to migrate a system to a 64-bit architecture.

Furthermore, the present invention's use of the 32-bit compatibility mode is non-obvious because the system executes the 32-bit OS kernel code in the compatibility mode. Note that 64-bit processors were never intended to execute 32-bit OS kernels. Instead, 64-bit processors were intended to execute 64-bit OS kernels. The 32-bit compatibility mode was provided to enable a 64-bit OS to support legacy 32-bit applications. Indeed, prior art 64-bit operating systems (e.g., Microsoft Windows family of OSs, various flavors of UNIX, etc.) use the 32-bit compatibility mode exactly for this purpose, namely, to support legacy 32-bit applications. In contrast to prior art techniques, the present invention uses the compatibility mode to execute a 32-bit OS kernel to support 64-bit applications. (Note that "Microsoft" and/or "Windows" may be trademarks of Microsoft Corporation, which may be registered in the United States and/or other countries.)

Another serious problem with prior art techniques involves porting 32-bit device driver code. Device drivers usually make up a significant portion of the operating system code in many operating systems. Many 32-bit device drivers use pointers to manipulate data, and hence the device drivers typically need to be rewritten so that they can properly interoperate with the 64-bit OS kernel. Additionally, many device drivers are developed and maintained by the device manufacturers and requiring them to rewrite their drivers to properly operate in a 64-bit kernel can impose a large burden on them.

In contrast to prior art techniques, embodiments of the present invention generally do not require 32-bit device driver code to be ported to 64-bits. This is because the present invention uses a 32-bit OS kernel, and, by definition, 32-bit device drivers interoperate with a 32-bit OS kernel.

A further advantage of the present invention is that the same OS kernel image can run on both 32-bit processors as well as 64-bit processors. Specifically, the same 32-bit OS kernel binary can boot-up on a 32-bit machine as well as a 64-bit machine. During boot-up the system detects that a 64-bit processor is available and unlocks the various features that are available in the 64-bit mode. However, during normal operation, both the 32-bit system and the 64-bit system execute almost the same 32-bit OS kernel code.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art.

For example, although the present invention has been described in the context of 32-bit and 64-bit architectures, embodiments of the present invention can generally be used to support N-bit processes using an M-bit OS kernel, provided that the underlying processor can switch between an N-bit mode and an M-bit mode.

The above disclosure is not intended to limit the present invention. The scope of the present invention is defined by the appended claims.

What is claimed is:

1. A method for mapping an N-bit application to a computer's virtual memory, wherein the N-bit application was obtained by porting an M-bit application to an N-bit architecture, wherein N is greater than M, the method comprising:

receiving a request to map an N-bit application to a computer's virtual memory; and mapping the N-bit application to a section of virtual memory which begins at a memory address that is greater than or equal to $2^M$;

wherein if the N-bit application accesses a memory address which is less than $2^M$, the computer generates a trap, thereby facilitating the discovery of M-bit memory references in the N-bit application.

2. A computer-readable storage medium storing instructions that when executed by a computer cause the computer to perform a method for mapping an N-bit application to the computer's virtual memory, wherein the N-bit application was obtained by porting an M-bit application to an N-bit architecture, wherein N is greater than M, the method comprising:

receiving a request to map an N-bit application to a computer's virtual memory; and mapping the N-bit application to a section of virtual memory which begins at a memory address that is greater than or equal to $2^M$;

wherein if the N-bit application accesses a memory address which is less than $2^M$, the computer generates a trap, thereby facilitating the discovery of M-bit memory references in the N-bit application.

3. An apparatus for mapping an N-bit application to a computer's virtual memory, wherein the N-bit application was obtained by porting an M-bit application to an N-bit architecture, wherein N is greater than M, the apparatus comprising:

a receiving mechanism configured to receive a request to map an N-bit application to a computer's virtual memory; and a mapping mechanism configured to map the N-bit application to a section of virtual memory which begins at a memory address that is greater than or equal to $2^M$;

wherein if the N-bit application accesses a memory address which is less than $2^M$, the computer generates a trap, thereby facilitating the discovery of M-bit memory references in the N-bit application.

* * * * *